(12) United States Patent
Murray

(10) Patent No.: US 6,201,687 B1
(45) Date of Patent: Mar. 13, 2001

(54) MODULAR FURNITURE WALL SYSTEM AND METHOD FOR TELECOMMUNICATIONS EQUIPMENT AND WIRE MANAGEMENT IN AN OPEN OFFICE ARCHITECTURE

(75) Inventor: Richard A. Murray, Longwood, FL (US)

(73) Assignee: American Access Technologies, Inc., Lake Mary, FL (US)

( * ) Notice: Subject to any disclaimer, the term of this patent is extended or adjusted under 35 U.S.C. 154(b) by 0 days.

(21) Appl. No.: 09/414,381

(22) Filed: Oct. 7, 1999

Related U.S. Application Data

(60) Provisional application No. 60/103,767, filed on Oct. 9, 1998.

(51) Int. Cl.[7] .................................................. H01R 13/68
(52) U.S. Cl. ........................ 361/626; 361/644; 361/827; 361/647; 361/648; 52/205; 52/239; 174/48
(58) Field of Search .................................... 361/600–602, 361/623–627, 643–648, 827–829; 174/48, 49, 59, 60; 52/220.7, 36.1, 239, 481.2, 36.2, 36.5, 240–243, 483.1, 561, 592.6, 205; 160/37; 248/222.13, 74.2, 68.1, 741.2, 245, 227.1; 312/196, 195, 198, 107, 223.1, 223.3, 223.6, 265.6, 265.4; 108/50.02; 439/215, 217, 502, 225, 701, 211, 210

(56) References Cited

U.S. PATENT DOCUMENTS

| | | |
|---|---|---|
| 3,780,351 | 12/1973 | Salmon et al. . |
| 4,496,057 | 1/1985 | Zenitani et al. . |

(List continued on next page.)

FOREIGN PATENT DOCUMENTS 0 456 421 A2   11/1991   (EP) .
0 458 487 A1   11/1991   (EP) .

(List continued on next page.)

OTHER PUBLICATIONS

Telecommunications Industry Association, TIA/EIA Telecommunications Systems Bulletin, *Additional Horizontal Cabling Practices for Open Offices*, Aug. 1996, pp. 1–5.

(List continued on next page.)

*Primary Examiner*—Gregory Thompson
*Assistant Examiner*—Michael Datskovsky
(74) *Attorney, Agent, or Firm*—Allen, Dyer, Doppelt, Milbrath & Gilchrist, P.A.

(57) ABSTRACT

A modular furniture wall system includes active telecommunications equipment and wire management in an open office architecture and effectively provides a telecommunications closet as part of the office furniture. Slip-fit styled U-shaped members are attached to vertical frame members which form a rectangular opening within the furniture frame. L-shaped members are adjustable connected to each other and between the U-shaped members for providing a channel for routing wire between extending legs of the L-shaped members and a spaced support for the mounting of standard electrical equipment. Opposing pairs of shelf elements are carried by opposing surfaces of the U-shaped member and the L-shaped member, respectively, with each of the opposing pair of shelf elements having a horizontal surface for supporting equipment such as active telecommunications switches, patch panels and cross-connects with their front surfaces facing upward. Wiring is routed from the electrical equipment through the channel, wire holders carried by the U-shaped members and through apertures within the L-shaped members. Thermally insulated cover panels having a recessed surface portion for providing a wire pathway between the cover panel and frame are supported by the frame, as is typical for such modular furniture, and enclose the wire, switch, panels, and other desired electronic equipment within the frame. Grounding wire is electrically connected between the frame, the U-shaped members, and the L-shaped members for providing a grounding connection therebetween, in addition to the grounding provided through the use of conductive elements used to construct the system.

33 Claims, 5 Drawing Sheets

U.S. PATENT DOCUMENTS

| | | |
|---|---|---|
| 4,497,411 | 2/1985 | DeBortoli . |
| 4,553,674 | 11/1985 | Yoshikawa et al. . |
| 4,641,754 | 2/1987 | Hebel et al. . |
| 4,715,502 | 12/1987 | Salmon . |
| 4,792,881 | 12/1988 | Wilson et al. . |
| 4,798,423 | 1/1989 | LaCour . |
| 5,024,167 | 6/1991 | Hayward . |
| 5,153,819 | 10/1992 | Hebel . |
| 5,328,260 | 7/1994 | Beirise . |
| 5,394,658 | 3/1995 | Schreiner et al. . |
| 5,429,431 | 7/1995 | Olson et al. . |
| 5,485,932 | 1/1996 | Romm et al. . |
| 5,586,012 | 12/1996 | Lerman . |
| 5,606,919 | 3/1997 | Fox et al. . |
| 5,660,120 | 8/1997 | Sims . |
| 5,683,001 | 11/1997 | Masuda et al. . |
| 5,697,811 | 12/1997 | Pickles et al. . |
| 5,746,488 | 5/1998 | LaCour . |
| 5,778,612 * | 7/1998 | Kissinger et al. .................... 52/205 |
| 5,788,087 | 8/1998 | Orlando . |
| 5,794,794 | 8/1998 | Hull . |
| 5,804,763 | 9/1998 | Smeenge . |
| 5,842,313 | 12/1998 | Murray et al. . |
| 5,911,661 | 6/1999 | Murray et al. |

FOREIGN PATENT DOCUMENTS

| | | |
|---|---|---|
| 0 695 011 A2 | 1/1996 | (EP) . |
| WO 98/32204 | 7/1998 | (WO) . |
| WO 98/37292 | 8/1998 | (WO) . . |

OTHER PUBLICATIONS

Anixter, EIA/TIA 569 Standard, A Reference Guide to the Commercial Building Standard for Telecommunications Pathways and Spaces, and TIA/EIA 607 Standard, A Reference Guide to the Commercial Building Grounding and Bonding Requirements for Telecommunications, Sep. 1996, pp. 1–17.

Cisco Systems, *Cisco Product Catalog*, Oct. 1997, pp. 667–672, 679–684, and 717–722.

Anixter, Structured Cabling Solutions Catalog, 1996, pp. 1–101 and 1–21 through 1–23.

Herman Miller, Inc., *Ethospace Interiors* brochure, 1991.

Herman Miller, Inc., *Systems Bridge Wall* brochure, 1997.

* cited by examiner

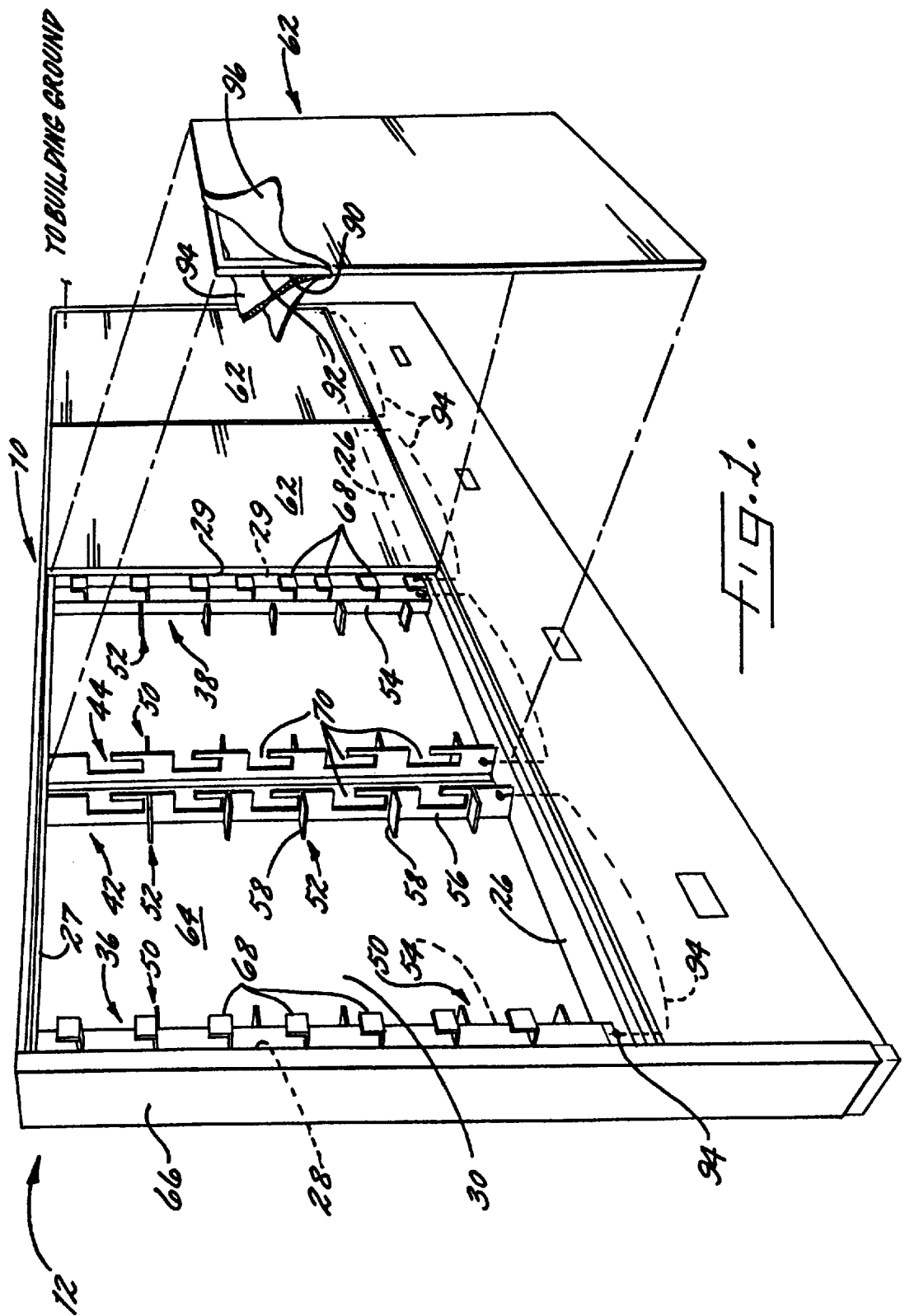

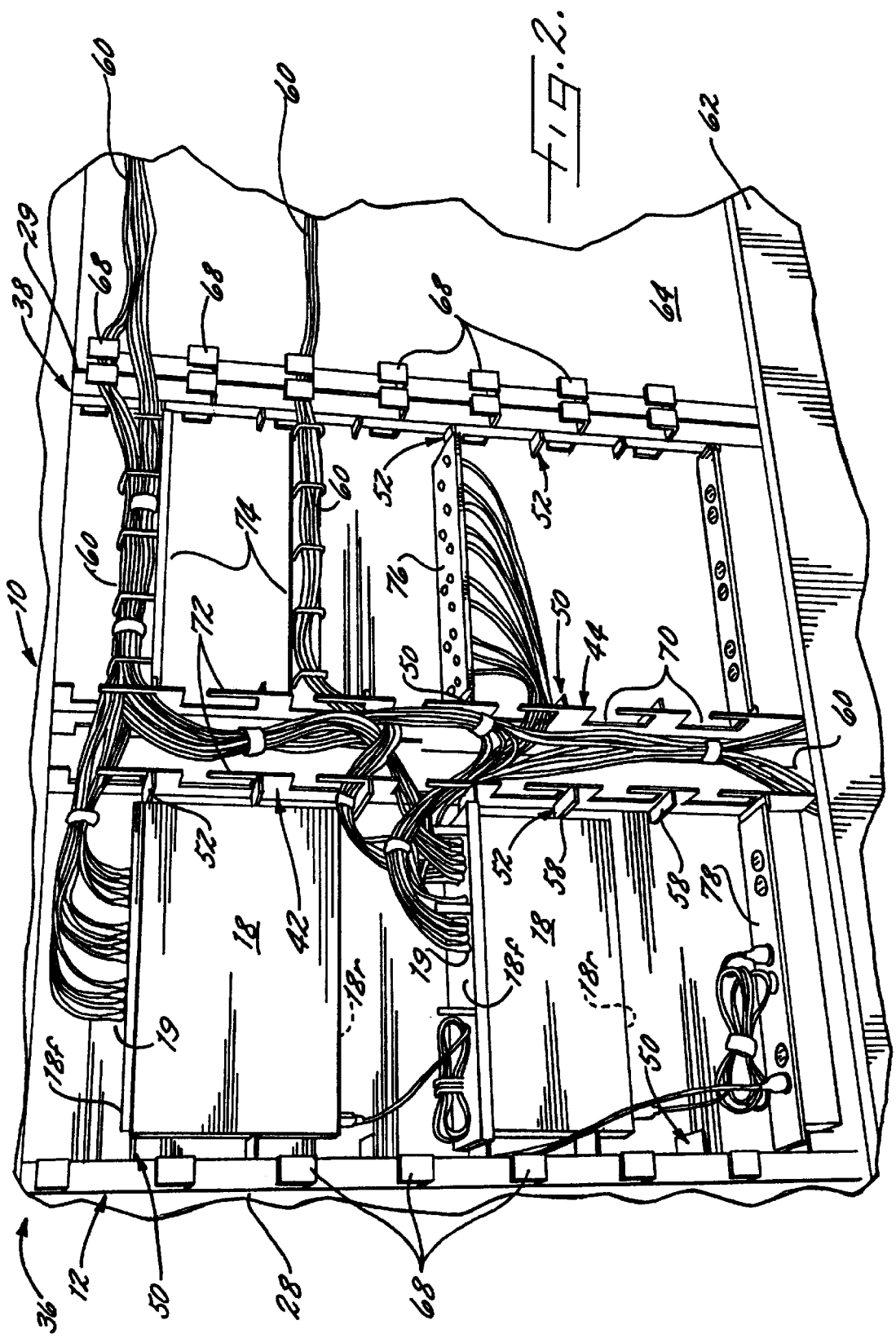

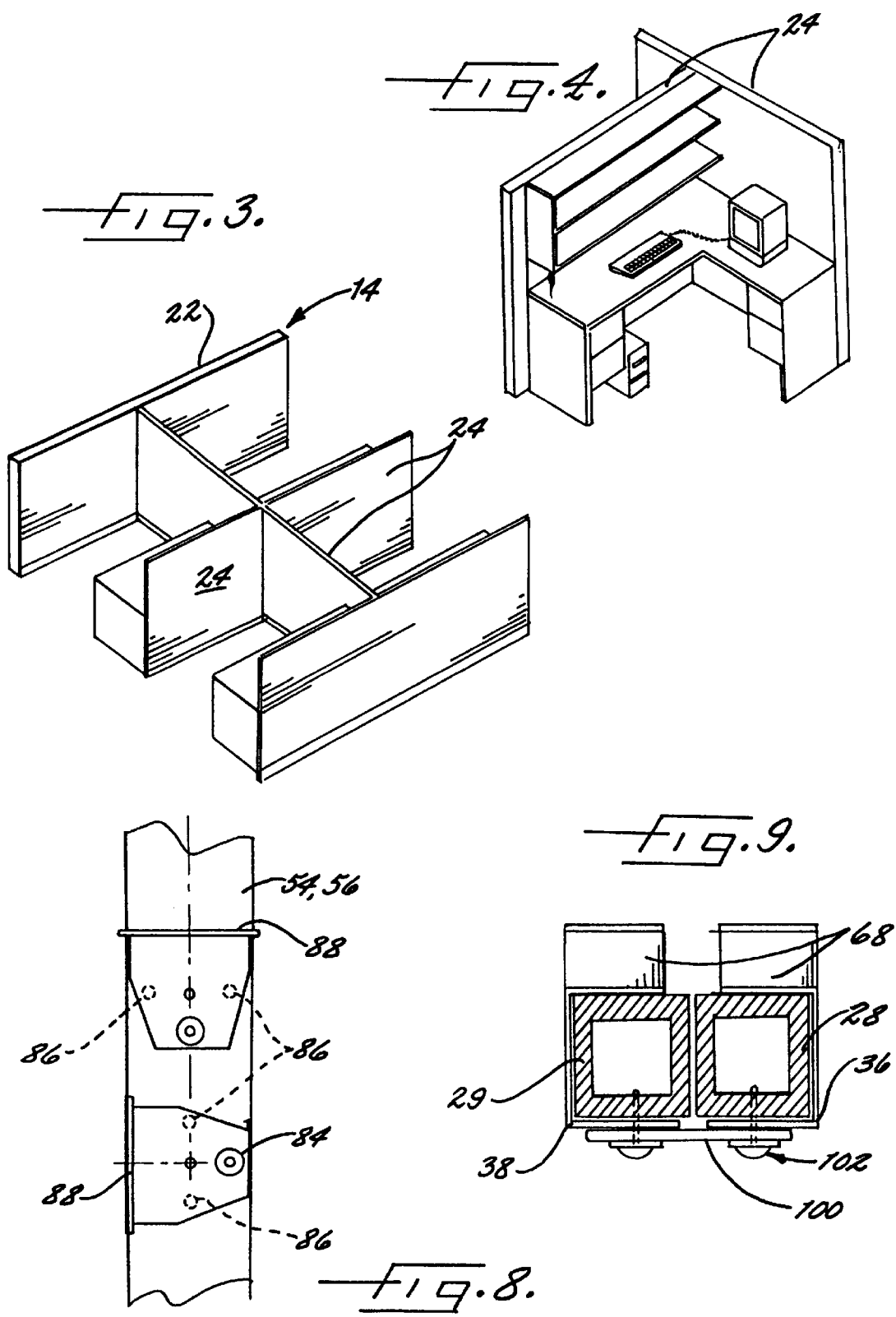

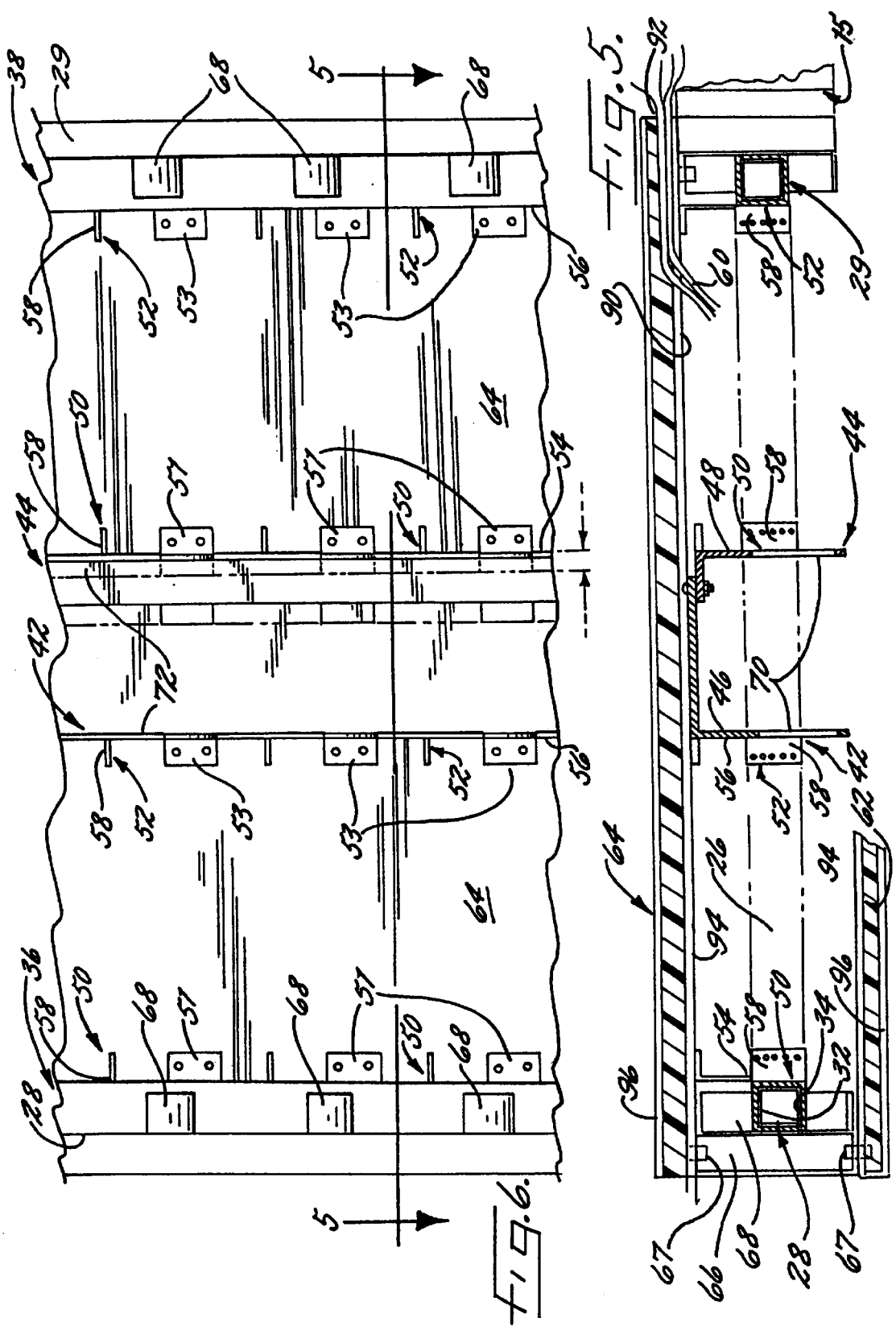

MODULAR FURNITURE WALL SYSTEM AND METHOD FOR TELECOMMUNICATIONS EQUIPMENT AND WIRE MANAGEMENT IN AN OPEN OFFICE ARCHITECTURE

CROSS REFERENCE TO RELATED APPLICATION

This application claims priority to Provisional Application Ser. No. 60/103,767 for "Zone Cabling Furniture Frame" having a filing date of Oct. 9, 1998, and commonly owned with the instant invention.

FIELD OF THE INVENTION

The present invention generally relates to telecommunications equipment and interconnects and, in particular, to telecommunications equipment operation within free standing modular furniture partition walls for an open office architecture.

BACKGROUND OF INVENTION

It is well known that the complexity of voice and data telecommunications has increased and with it standard for insuring operation flexibility and manageability of supporting systems. Telecommunications include voice, data, and video transmission of information, fire and security matters, audio, environmental, and other intelligent building controls over media that typically includes fiber optics, specialized copper data cabling, as well as microwave and radio wave transmissions. Office design practices have introduced flexible layouts designed to support workgroups and small teams. As a result, spaces for such teams are frequently rearranged to meet the changing requirements of the work for an individual and that of the team, resulting in an open office work environment that often requires reconfiguration. Standards including those of the American National Standards Institute ("ANSI"), the Electronic Industries Association ("EIA"), and the Telecommunications Industry Association ("TIA") play an important role and, in fact, place stringent requirements on the construction and layout of such open office environments. By way of example, an interconnection in horizontal cabling that allows for open office spaces to be reconfigured frequently without disturbing horizontal cable runs must meet standards such as EIA/TIA 569, TIA/EIA 607, and TSB 75. Such standards provide for interconnection capability including multiuser outlet/connector and transition points, by way of example. In general, TIA standards allow for various connections in the horizontal cabling between horizontal cross connects and telecommunication outlets and connectors.

Typically, a wiring management system may be provided for use in furniture components and will include routing channels for routing wire throughout the system as illustrated by way of example with U.S. Pat. No. 5,429,431 to Olson et al, and the free standing modular furniture of U.S. Pat. No. 5,394,658 to Schreiner et al. As described, the use of wire management and modular furniture components in an office environment provides for the routing of power and other cabling to various electrical appliances in the office space to permit efficient use of that space. However, the installation and maintenance requirements of wire management systems have posed practical difficulties that include the interconnection of various active and routing electrical components for meeting the demands of the office space, while at the same time effectively concealing the wiring and electrical components from view. As is often the case, various wire management systems associated with office furniture will focus on the wire management needs for connection and interconnection with communications outlets provided to the office workstation, which outlets have horizontal interconnections to a remotely located telecommunications closet. As a result, various communications organizing methods and devices typically concentrate on the connection to appropriate connectors and the storage of excess links of cable within compartments formed within furniture modules such as described in U.S. Pat. No. 4,792,881 to Wilson et al. Further, although it is well known to rack mount electronics equipment on framing structures, and organize wire runs within wire management systems, as described by way of example, in U.S. Pat. No. 5,153,819 to Hebel; U.S. Pat. No. 5,586,012 to Lerman; and U.S. Pat. No. 5,788,087 to Orlando, such systems have not addressed the needs of the open office and would not meet the needs identified while keeping to the standards of the industry.

Although many innovations have been directed to the open office for providing floor space division using furniture, movable partitions, and other means other than building permanent walls, none have focused on the important requirement that the workstation, having the multiuser telecommunications equipment and assemblies, is required to be within fixed and often long distances to the telecommunications closet, which will typically house vital active switching equipment. Usually, the telecommunications closet is based on each floor of a building and is the junction between a backbone and the horizontal pathways for such cabling routed to the various workstations. The telecommunications closet will typically include both voice and data telecommunications equipment, termination fields and cross connect wiring. Planning and layout of the open office must therefore be concerned about distances to this telecommunications closet and, as a result, configure the workstation environment and location of each workstation carefully in arranging an effective floor plan.

SUMMARY OF INVENTION

In view of the foregoing background, it is therefore an object of the present invention to provide a system and method for expanding the capability of the open office architecture by providing a modular furniture wall with a telecommunications closet capability. It is further an object of the present invention to use off-the-shelf components within such a furniture wall for providing a distributed architecture within the stringent electrical and telecommunications codes and standards.

These and other objects, advantages and features of the present invention are provided by a modular furniture wall system useful in providing active telecommunications equipment and wire management in an open office architecture. The wall system comprises an upright oriented supporting frame including opposing horizontal and vertical frame members fixedly joined to form a rectangular opening sufficient for receiving an electronic circuit package therein, wherein each of the frame members include at least one pair of parallel surfaces. First and second opposing U-shaped members are fixedly attached to the opposing vertical frame members, respectively, wherein the pair of parallel surfaces is received within a slot formed between opposing legs of the U-shaped member. A first L-shaped member is adjustable connected to a second L-shaped member for providing a channel between extending first and second legs of the L-shaped members. Further, the first and second L-shaped members are adjustable secured to the opposing horizontal frame members and positioned between the first and second opposing U-shaped members. Opposing pairs of shelf elements are carried by opposing surfaces of the U-shaped member and the L-shaped member, respectively, with each of the opposing pair of shelf elements having a horizontal surface for supporting an electronic circuit package such as an active telecommunications switch. Typically, the electronic circuit package will have opposing front and rear surfaces including electrical connectors thereon. In the preferred embodiment, the package is removably mounted to the opposing pair of shelf elements with the front and rear surfaces within generally horizontal planes, the front face preferable facing upward. Wiring is routed from the electronic circuit package through the channel and outward from the frame. Opposing first and second cover panels are supported by the frame, which cover panels cover the opening thereof to enclose the electronic circuit package and wire within therein.

Preferable, the frame members are formed from tubular steel having a rectangular cross-section for slidably receiving the U-shaped members. To further manage the routing of the wiring, a plurality of wire holders are carried by opposing sides of each of the U-shaped members for guiding wire from within the rectangular opening outward therefrom. In addition, each of the L-shaped members includes apertures within side wall portions for guiding the wire therethrough into the channel formed therebetween. In an alternate embodiment, at least one opposing pair of shelf elements is pivotally attached to the respective U-shaped and L-shaped members for movement from a horizontal to a vertical position. Such a pivoting feature may be preferred for routing off-the-shelf patch and cross-connect panels typically used in wire management systems. The system of the present invention further includes cover panels comprising a recessed surface portion for providing a wire pathway between the cover panel and the frame for passing wire therethrough. Grounding wire is electrically connected between the frame, the U-shaped members, and the L-shaped members for providing a grounding connection therebetween, in addition to the grounding provided through the use of conductive elements used to construct the system. Preferably, thermal insulating sheeting material is carried on inside surfaces of the cover panels.

A method aspect of the invention is a method for converting a modular furniture wall into an active telecommunications equipment and wire management system for an open office architecture, wherein the wall includes an upright supporting frame having opposing horizontal and vertical frame members defining a rectangular opening sufficient for receiving an electronic circuit package therein, and opposing cover panels enclosing the frame. The method includes the steps of removing the opposing cover panels from the frame, providing first and second U-shaped members for fitting onto the vertical frame members, and fitting the first and second U-shaped members onto the opposing vertical frame members, wherein the vertical frame members are received within a slot formed between opposing legs of the U-shaped member. The U-shaped members are fixedly attached to the opposing vertical frame members, respectively. The L-shaped members are placed between the first and second opposing U-shaped members for providing a channel between extending first and second legs thereof, and are adjustably secured to the opposing horizontal frame members for providing a spaced relation to the opposing U-shaped members sufficient for receiving an electronic circuit package therebetween. The electronic circuit package, having opposing front and rear surfaces including electrical connectors thereon, is mounted between a selected U-shaped member and opposing L-shaped member for placing the front and rear surfaces within generally horizontal planes. Wire is routed from the electronic circuit package through the channel and outward from the frame, as desired. The cover panels are then attached to the frame.

Preferably, the frame members are formed from tubular steel having a cross-section wherein the U-shaped member closely fit to the tubing. Wire holders are carried by opposing sides of each of the U-shaped members for routing the wire through the wire holders, and each of the L-shaped members include apertures within side wall portions for routing the wire through selected apertures into the channel. In an alternated embodiment, shelf elements are pivotally attached to the opposing U-shaped and L-shaped members for movement of the shelf elements and patch panels or cross-connect panels attached thereto from a horizontal to a vertical position.

BRIEF DESCRIPTION OF DRAWINGS

A preferred embodiment of the invention as well as alternate embodiments are described by way of example with reference to the accompanying drawings in which:

FIG. 1 is a partial exploded and perspective view of a modular furniture wall system for providing active telecommunications equipment and wire management in keeping with the present invention;

FIG. 2 is a partial perspective view of the system of FIG. 1 further illustrating equipment and wire management within the system;

FIG. 3 is a perspective view of the modular furniture wall system of FIG. 1 illustrating use in one open office environment;

FIG. 4 is a perspective view of a work station illustrating use of a furniture wing wall of the present invention;

FIG. 5 is a partial cross-section plan view taken through lines 5—5 of FIG. 6;

FIG. 6 is an enlarged partial front elevation view of the embodiment of FIG. 1;

FIG. 8 is a partial front elevation view of a rotatable shelf element of the present invention; and FIG. 9 is a partial cross-section plan view illustrating a bonding ground connection between members of the system of FIG. 1.

DETAILED DESCRIPTION OF PREFERRED EMBODIMENTS

Figure 7:
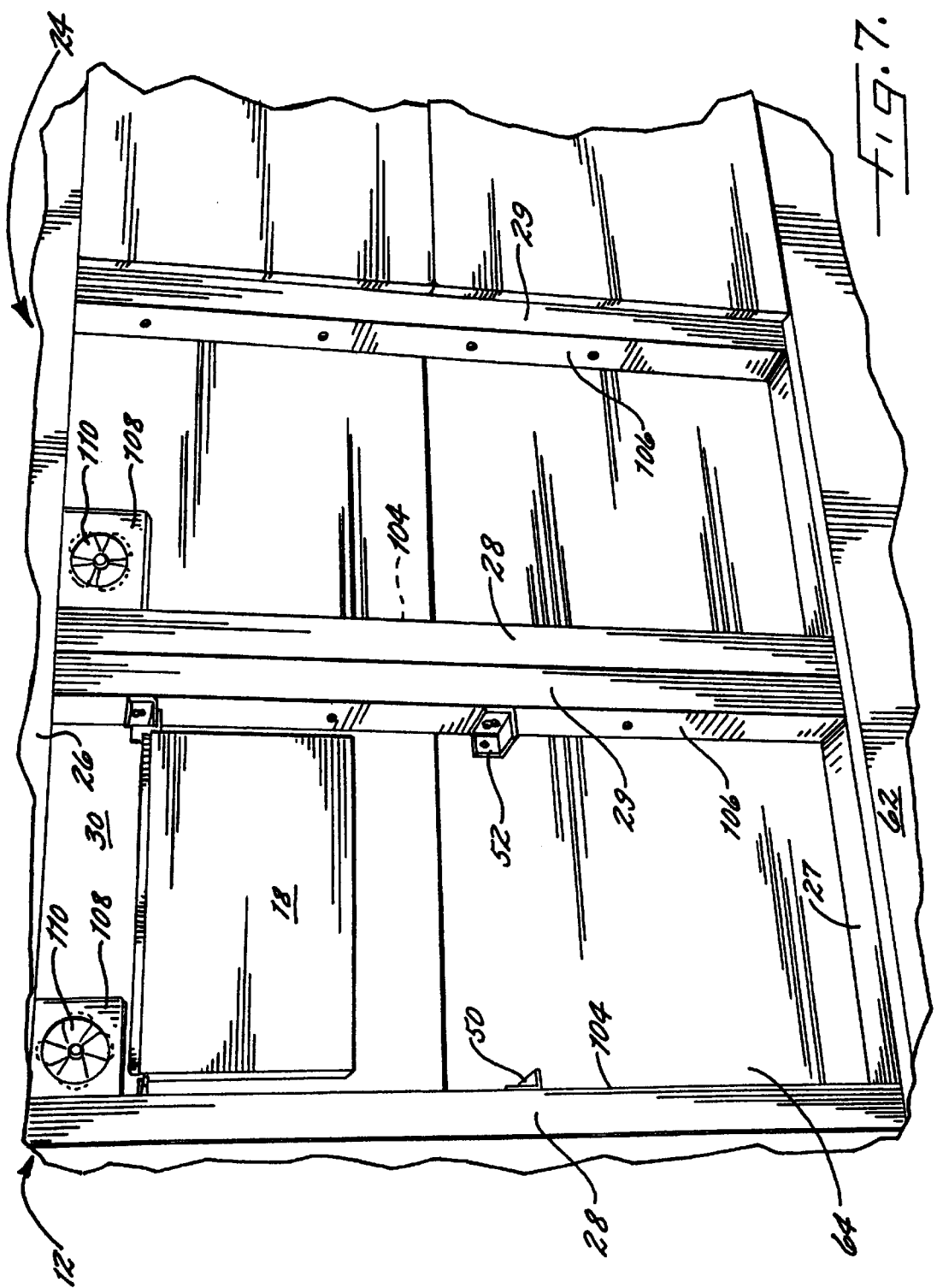
FIG. 7 is a partial perspective view of an open wing wall of FIG. 4.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring now initially to FIGS. 1 and 2, a modular furniture wall system 10 useful in providing active telecommunications equipment and wire management in an open office architecture environment, in accordance with the present invention, includes a furniture frame 12, which frame may be fabricated as preferred, or an existing frame within an existing furniture wall 14 for carrying telecommunications equipment 16, including active switches 18 and passive equipment 20, such as patch panels and cross-connects, by way of example, typically carried within a telecommunications closet that heretofore needed to be remotely located from the open office environment. As illustrated with reference to FIGS. 3 and 4, in both a bridging furniture wall 22 typically having an interior cavity width of approximately four to six inches, and a freestanding furniture wing wall 24, typically having a width of only a few inches, both required, and often demanded for the modern open office workstation, an active telecommunications capability is achieved with the present invention, as will be further detailed herein.

With reference again to FIGS. 1 and 2, the modular furniture wall system 10, in one preferred embodiment, comprises the upright oriented supporting frame 12 including opposing horizontal and vertical frame members 26, 28 fixedly joined to form a rectangular opening which is sufficient in size for receiving telecommunications circuit packages such as the active switch 18 and passive equipment 20, earlier described. Each of the frame members include at least one pair of opposing parallel surfaces 32, 34, as provided by rectangular tubular steel frame members 26, 28 welded together to form the frame of the preferred embodiment herein described, and illustrated with reference to FIG. 5. As further illustrated with reference again to FIGS. 1, 2, and 5, and to FIG. 6, first and second, herein referred to for convenience as left and right opposing U-shaped members 36, 38, as viewed, are fixedly attached to the opposing vertical frame members 28, 29 respectively, wherein the parallel surfaces 32, 34 are received within a slot 40 formed between opposing legs of the U-shaped members 36, 38 for providing a slip-fit styled connection. Once slipped into place, the left and right U-shaped members 36, 38, are rigidly affixed to the frame members 28, 29 using metal screws or other attaching means, as desired. Further, a first, left L-shaped member 42 is adjustable connected to a second, right L-shaped member 44 for providing a channel 45 between extending legs 46, 48 of the respective L-shaped members 42, 44, thus forming a vertical raceway for desirable cable management. The left and right L-shaped members 42, 44 are adjusted and positioned between the opposing U-shaped members 36, 38 and secured at their respective top and bottom ends to the opposing horizontal frame members 26, 27. Opposing pairs of shelf elements 50, 52 are carried by opposing surfaces 54, 56 of the U-shaped members 36, 38 and the L-shaped members 42, 44, respectively, with each of the opposing pair of shelf elements preferably having a horizontal surface 58 for supporting the telecommunications equipment 16, such as the active telecommunications switch 18. Typically, the equipment 16, such as the switch 18, will have opposing front and rear surfaces 18f, 18r including electrical connectors 19 thereon. In the preferred embodiment, the switch 18, by way of example, is removably mounted to the opposing pair of shelf elements 50, 52 with its front and rear surfaces 18f, 18r within generally horizontal planes, the front facing surface 18f preferable facing upward, as illustrated again with reference to FIG. 2, by way of example. The present invention includes the telecommunications equipment 16 preferably carried by the shelf elements 50, 52 to accommodate the use of off-the-shelf rack mount styled components, as illustrated with reference also to the wing wall 24 of FIG. 7. However, in the alternative, opposing brackets 51, 53, illustrated with reference again to FIG. 6, by way of example, may be used to mount the equipment 16 thereto.

By way of example, and as illustrated with reference again to FIGS. 1 and 2, wiring 60 is routed from the active switch 18 through the channel 45 and outward from the frame 12 as desired. Opposing front and rear cover panels 62, 64 are supported by the frame 12 using frame extensions 66 along between and at ends of the frame, and clips 67 well known in the art, which cover panels 62, 64 cover the opening 30 and thus enclose the equipment 16 within the furniture wall 14. As further illustrated with reference again to FIG. 5, by way of example, the wire holders 68 are dimensioned to extend outward from the U-shaped members 36, 38 for contacting the panels 62, 64 and provide further support and reinforcing of the panels. To further manage the routing of the wiring 60, wire holders 68 are carried on each of the U-shaped members 36, 38 for guiding wiring from within the frame 12 and outward as may be desired. In addition, each of the L-shaped members 42, 44 includes apertures 70 within side walls 72 for guiding the wiring 60 therethrough into the channel 45. The side wails 72 of each L-shaped member 42, 44 are dimensioned to extend outward for contacting the panels 62, 64, and like the wire holders 68, earlier described, provide additional support and reinforcing of the panels. As desired, off-the-shelf patch cord organizers 74 and cross-connects 76, as well as power strips 78 providing power to the switch, by way of example, may be mounted to the shelf elements 50, 51 for yet further wire management within the system 10.

In an alternate embodiment, and as illustrated with reference to FIG. 8, shelf elements 80 are rotatably attached to the opposing faces 54, 56, of the U-shaped and L-shaped members earlier described with reference to FIG. 5, for rotation about a pivot pin 82 for movement and locking into a horizontal and vertical alignments, upward, forward and rearward, using a spring loaded key 84 positionable into and out of holes 86 carried within the surfaces 54, 56, for movement from a horizontal to a vertical position for the mounting surface 88. Such a pivoting feature may be preferred for the routing off-the-shelf patchcord organizer 74 and cross-connect 76 earlier described with reference to FIG. 2, by way of example.

With reference again to FIGS. 1 and 5, the cover panels 62, 64 on furniture walls of the present invention include a recessed surface portions 88 at preselected locations along the panels and on the inside surface 90 which is attached to the frame 12 for providing a wire pathway 92 between the cover panel 62, 64 and the frame 12 for passing wiring 60 therethrough and to an adjoining wall 15, by way of example. In a preferred embodiment, and as illustrated again with reference to FIG. 1, thermal insulating sheeting material 94 is carried on inside surfaces of the cover panels 62, 63, and hidden from view by the finished cloth 96 typically used to ornament the wall 14.

As illustrated with reference again to FIG. 1, grounding wire 98 is electrically connected between the frame 12, the U-shaped members 36, 38, and the L-shaped members 42, 44 for providing a grounding connection therebetween, in addition to the grounding provided through the use of conductive elements, such as the steel tubing used for the frame and sheet metal used for the members in constructing the preferred embodiment of the system 10, herein described by way of example. By way of further example, and with reference to FIG. 9, a bonding strip 100 is used in one preferred embodiment when extending a ground connection from one U-shaped member 28 attached to one frame member 28 when extending the ground connection to an adjoining U-shaped member 38 attached to an adjoining frame member 29, or same rectangular member if sufficiently dimensioned, metal screws and star washers 102 being used to attach the strip to the U-shaped members and onto the frame members.

With reference again to FIG. 7, one preferred embodiment of the present invention includes left and right inserts 104, 106 which are attached the frame members 28, 29 of the wing wall 24 and include the shelf elements 52, 54 earlier described. Such inserts 104, 106 provide matching brackets for connection of 19" rack equipment 16 as earlier described. In addition, a top housing portion 108 includes ventilation equipment such as an electric fan 110. In a preferred embodiment, the inserts are formed from aluminum sheet metal and configured in a mirror image for providing themselves, and off-the-shelf unit for ease in installation of telecommunications equipment within the furniture wing walls. As described, the wing wall 24, in accordance with the present invention, provides a shallow telecommunications closet that meets the needs of the user and the requirements of existing telecommunications and electrical codes.

With furniture walls heretofore being limited to routing of only high voltage electrical power equipment, junction boxes, and passive electronics, as earlier described, the system 10 of the present invention has been herein described by way of example using a furniture wall in the art that was designed by Jack Kelly for the Herman Miller Company and retrofitting the wall to satisfy the needs in the industry. The interior cavity or spacing between panels was 4½" wide with the panels easily removed for quick access to the interior and installation of the U-shaped members 36, 36 having the wire holders 68, and the L-shaped members 42, 44 above described. Eight wire, four circuit/80 amp power is provided to the wall. In a lower section of the wall, duplex receptacles and telecommunications ports are typically located. Wiring included cables entering through ceiling feeds and through underground or side wall access locations, all of which were easily accommodated by the system of the present invention. Consolidation points or multiuser outlets are thus able to be placed within the furniture wall 14, bridging or wing walls 22, 24 of the system 10 thus reducing point-to-point home runs to various workstations.

By way of further emphasis on existing conditions in the industry, there are requirements that horizontal cable runs be limited in length, as described in TIA/EIA Telecommunications Systems Bulletin TSB75, August 1996, published by the Telecommunications Industry Association. Such requirements specify the horizontal distances, for optical fiber cables, any length combination of horizontal cables, work area cables, patch cords, and equipment cables, not exceed 100 meters (328 feet). By way of further example, horizontal distances of copper links, copper work area cables, used in the context of multiuser communications outlet assemblies and open office furniture, must not exceed 90 meters (295 feet). There are yet further constraints that cross connections shall not be used at a consolidation point, and that no more than one consolidation point be used within the same horizontal cable run. It will be appreciated by one skilled in the art that a typical telecommunications entrance to a building and its multiple telecommunications closets must be so located based on building constraints that the free arrangement of an office architecture typically comes with many limitations. As illustrated with reference to the above described embodiment of the present invention, such requirements are easily met and exceeded by the present invention by overcoming cable distance requirements, grounding and bonding requirements, and consolidating equipment and cable use within the wall 14. As ;a result of the present invention, coax, fiber, or twisted pair wiring can now be run from a telecommunications closet in a building to the switch 18, by way of example, carried within the 12. Copper cable, or appropriate cable to meet the demands of the workstation, can then be run from the switch via the raceway to a cross connect and then via cable management to a patch panel, as illustrated earlier by way of example. From the patch panel, modification or selection of specific user requirements can be facilitated by the user by routing a particular telecommunications signal to a specific workstation. As a result, a distance requirement, as earlier described, is now measured from the switch 18 located within the furniture wall 14, rather than a remote telecommunications closet. In effect, the present invention has converted the well known furniture bridge wall to a telecommunications closet. The "slip-fit" rack styled assembly provided by the present invention permits the installation of switches, patch panels, and cross connects and thus a telecommunications distribution system within the furniture bridge wall. Such an arrangement allows for high wiring and cable capacity and routing capability and allows for the mounting of active and passive devices inside the furniture wall.

It is to be understood that active devices, wire management, and passive devices are installed to meet the user's demands, with the result that the installation of such switching equipment provides additional flexibility for routing telecommunications equipment throughout a building workstation area. In addition, by providing patch panel access to a user, the user can route and reroute telecommunications (voice or data) to various workstations without the need for expensive rerouting and labor costs. In addition, there is the further benefit of using typically empty space for a zone cabling application that provides active switching and cabling within an environment satisfactory to all.

Many modifications and other embodiments of the invention will come to the mind of one skilled in the art having the benefit of the teachings presented in the foregoing descriptions and the associated drawings. The specific embodiment shown in the accompanying drawings and described herein is offered by way of illustration only. Therefore, it is to be understood that the invention is not to be limited to the specific embodiments disclosed, and that modifications and alternate embodiments are intended to be included within the scope of the appended claims.

What is claimed is:

1. A modular furniture wall system useful in providing active telecommunications equipment and wire management in an open office architecture, the wall system comprising:

an upright oriented supporting frame including opposing horizontal and vertical frame members fixedly joined to form a rectangular opening sufficient for receiving an electronic circuit package therein, wherein each of the frame members include at least one pair of parallel surfaces;

first and second opposing U-shaped members fixedly attached to the opposing vertical frame members, respectively, wherein the at least one pair of parallel surfaces is received within a slot formed between opposing legs of the U-shaped member;

a first L-shaped member adjustable connected to a second L-shaped member for providing a channel between extending first and second legs thereof, the first and second L-shaped members adjustable secured to the opposing horizontal frame members and positioned between the first and second opposing U-shaped members;

an opposing pair of shelf elements mounted to opposing surfaces of the U-shaped member and the L-shaped member, respectively, each of the opposing pair of shelf elements having a horizontal surface for supporting an electronic circuit package thereon;

an electronic circuit package having opposing front and rear surfaces including electrical connectors thereon, the electronic circuit package mounted to the opposing pair of shelf elements for placing the front and rear surfaces within generally horizontal planes;

electric wire routed from the electronic circuit package through the channel and outward from the frame;

opposing first and second cover panels supported by the frame, the cover panels covering the opening thereof to enclose the electronic circuit package and wire therein.

2. A wall system according to claim 1, wherein the frame members are formed from tubular steel having a rectangular cross-section.

3. A wall system according to claim 1, further comprising a plurality of wire holders carried by opposing sides of each of the U-shaped members for guiding wire from within the rectangular opening outward therefrom.

4. A wall system according to claim 1, wherein each of the L-shaped members include apertures within side wall portions for guiding the wire therethrough into the channel formed therebetween.

5. A wall system according to claim 1, at least one opposing pair of the shelf elements is pivotally attached to the respective U-shaped and L-shaped members for movement of the at least one opposing pair of the shelf elements from a horizontal to a vertical position.

6. A wall system according to claim 1, wherein at least one of the first and second cover panels comprises a recessed surface portion for providing a wire pathway between the at least one cover panel and the frame for receiving the wire therethrough.

7. A wall system according to claim 1, further comprising a grounding wire electrically connected between the frame, the U-shaped members, and the L-shaped members for providing a grounding connection therebetween.

8. A wall system according to claim 1, further comprising thermal insulating material carried by the cover panels.

9. A wall system according to claim 1, wherein the electronic circuit package comprises an active telecommunications switch.

10. A modular furniture wall system useful in providing active telecommunications equipment and wire management in an open office architecture, the wall system comprising:

an upright oriented supporting frame including opposing horizontal and vertical frame members fixedly joined to form a rectangular opening sufficient for receiving an electronic circuit package therein, wherein each of the frame members include at least one pair of parallel surfaces;

first and second opposing U-shaped members fixedly attached to the opposing vertical frame members, respectively, wherein the at least one pair of parallel surfaces is received within a slot formed between opposing legs of the U-shaped member;

a first L-shaped member adjustable connected to a second L-shaped member for providing a channel between extending first and second legs thereof, the first and second L-shaped members adjustable secured to the opposing horizontal frame members and positioned between the first and second opposing U-shaped members;

an opposing pair of shelf elements mounted to opposing surfaces of the U-shaped member and the L-shaped member, respectively, for supporting an electronic circuit package thereon; and opposing first and second cover panels supported by the frame, the cover panels covering the opening thereof to enclose the electronic circuit package and wire therein.

11. A wall system according to claim 10, wherein the frame members are formed from tubular steel having a rectangular cross-section.

12. A wall system according to claim 10, further comprising a plurality of wire holders carried by opposing sides of each of the U-shaped members for guiding wire from within the rectangular opening outward therefrom.

13. A wall system according to claim 10, wherein each of the L-shaped members include apertures within side wall portions for guiding the wire therethrough into the channel formed therebetween.

14. A wall system according to claim 10, at least one opposing pair of the shelf elements is pivotally attached to the respective U-shaped and L-shaped members for movement of the at least one opposing pair of the shelf elements from a horizontal to a vertical position.

15. A wall system according to claim 10, wherein the first cover panel comprises a recessed surface portion for providing a wire pathway between the first cover panel and the frame for receiving wire therethrough.

16. A wall system according to claim 10, further comprising a grounding wire electrically connected between the frame, the U-shaped members, and the L-shaped members for providing a grounding connection therebetween.

17. A wall system according to claim 10, further comprising thermal insulating material carried by each of the first and second cover panels.

18. A wall system according to claim 10, wherein the first and second cover panels are carried in a spaced relation and separated a distance measuring less than approximately six inches.

19. A modular furniture wall system useful in providing active telecommunications equipment and wire management in an open office architecture, the wall system comprising:

an upright oriented supporting frame including opposing horizontal and vertical frame members fixedly joined to form a rectangular opening sufficient for receiving an electronic circuit package therein, wherein each of the frame members include at least one pair of parallel surfaces;

first and second opposing bracket members fixedly attached to the opposing vertical frame members;

an opposing pair of shelf elements mounted to opposing surfaces of the bracket members, respectively, for supporting an electronic circuit package thereon; and an electronic circuit package having opposing front and rear surfaces including electrical connectors thereon, the electronic circuit package mounted to the opposing pair of shelf elements for placing the front and rear surfaces within generally horizontal planes;

opposing first and second cover panels supported by the frame, the cover panels covering the opening thereof to enclose the electronic circuit package and wire therein.

20. A wall system according to claim 19, wherein the frame members are formed from tubular steel having a rectangular cross-section.

21. A wall system according to claim 19, further comprising a fan carried by the bracket member and operable for circulating air through the frame.

22. A wall system according to claim 19, wherein the first cover panel comprises a recessed surface portion for providing a wire pathway between the first cover panel and the frame for receiving wire therethrough.

23. A wall system according to claim 19, further comprising thermal insulating material carried by each of the first and second cover panels.

24. A wall system according to claim 19, wherein the first and second cover panels are carried in a spaced relation and separated a distance measuring less than approximately three inches.

25. A method for converting a modular furniture wall into an active telecommunications equipment and wire management system for an open office architecture, wherein the wall includes an upright supporting frame having opposing horizontal and vertical frame members defining a rectangular opening sufficient for receiving an electronic circuit package therein, and opposing cover panels enclosing the frame, the method comprising the steps of:

removing the opposing cover panels from the frame;

providing first and second U-shaped members for fitting onto the vertical frame members;

fitting the first and second U-shaped members onto the opposing vertical frame members, wherein the vertical frame members are received within a slot formed between opposing legs of the U-shaped member;

fixedly attaching the first and second U-shaped members to the opposing vertical frame members, respectively;

placing first and second L-shaped members between the first and second opposing U-shaped members for providing a channel between extending first and second legs thereof;

adjustably securing the first L-shaped member and a second L-shaped member to the opposing horizontal frame members for providing a spaced relation to the opposing U-shaped members sufficient for receiving an electronic circuit package therebetween;

providing an electronic circuit package having opposing front and rear surfaces including electrical connectors thereon;

mounting the electronic circuit package between a selected U-shaped member and opposing L-shaped member for placing the front and rear surfaces within generally horizontal planes;

routing wire from the electronic circuit package through the channel and outward from the frame; and removably attaching the cover panels to the frame.

26. A method according to claim 25, wherein the frame members are formed from tubular steel having a rectangular cross-section, and wherein the U-shaped member fitting step comprises the step of closely fitting the U-shaped member onto the rectangular tubing.

27. A method according to claim 25, further comprising a plurality of wire holders carried by opposing sides of each of the U-shaped members, and wherein the wire routing step comprises the step of routing the wire through the wire holders carried within the rectangular opening outward therefrom.

28. A method according to claim 25, wherein each of the L-shaped members include apertures within side wall portions, and wherein the wire routing step comprises the step of routing the wire through selected apertures into the channel.

29. A method according to claim 25, further comprising the step of pivotally attaching shelf elements to the opposing U-shaped and L-shaped members for movement of opposing pairs of the shelf elements from a horizontal to a vertical position.

30. A method according to claim 25, wherein at least one of the cover panels comprises a recessed surface portion for providing a wire pathway between the at least one cover panel and the frame, and wherein the wire routing step comprises the step of routing wire from within the rectangular aperture of the frame through the pathway for carrying the wire outward of the frame.

31. A method according to claim 25, further comprising the step of electrically connecting a grounding wire between the frame, the U-shaped members, and the L-shaped members for providing a grounding connection therebetween.

32. A method according to claim 25, further comprising the step of attaching thermal insulating material onto opposing inside surfaces of the cover panels.

33. A method according to claim 25, wherein the electronic circuit package comprises an active telecommunications switch.

* * * * *